United States Patent [19]
Ball

[11] Patent Number: 5,333,888
[45] Date of Patent: Aug. 2, 1994

[54] TRAILER HITCH WEDGE

[76] Inventor: Carrol Ball, P.O. Box 988, Shingle Springs, Calif. 95682

[21] Appl. No.: 58,209

[22] Filed: May 10, 1993

[51] Int. Cl.$^5$ .............................................. B60D 1/155
[52] U.S. Cl. ................................... 280/504; 280/506; 280/508
[58] Field of Search ............... 280/504, 506, 508, 477, 280/491.2

[56] References Cited

U.S. PATENT DOCUMENTS 2,984,502  5/1961  Tyrrell ................................ 280/506

FOREIGN PATENT DOCUMENTS

| | | | |
|---|---|---|---|
| 1580670 | 1/1979 | Fed. Rep. of Germany | 280/506 |
| 3416631 | 11/1985 | Fed. Rep. of Germany | 280/504 |
| 0240526 | 11/1986 | Fed. Rep. of Germany | 280/504 |
| 3937894 | 5/1991 | Fed. Rep. of Germany | 280/504 |
| 2235668 | 3/1991 | United Kingdom | 280/506 |

Primary Examiner—Richard M. Camby
Assistant Examiner—Carla Mattix
Attorney, Agent, or Firm—William S. Bernheim

[57] ABSTRACT

A hitch for a vehicular tow trailer which can be rigidly yet removably attached to a sleeve has a shaft which slides into the sleeve and locks with a pin in a conventional manner. The shaft is divided into two sections that are separated by parallel planes that are inclined to the direction the shaft is inserted in the sleeve. The sections are connected by a bolt which traverses the inclined planes threading into one section while being operable from the outside of the other. Tightening of the bolt causes the sections to slide to opposite sides of the sleeve, wedging the shaft within the sleeve and eliminating play between the shaft and sleeve.

8 Claims, 1 Drawing Sheet

TRAILER HITCH WEDGE

BACKGROUND OF THE INVENTION

1. Field of the Invention

The present invention relates to a device used to rigidfly a hitch for a vehicular tow trailer.

2. Description of the Prior Art

Hitches have long been used to provide a mechanism for connecting a trailer with a towing vehicle. Such hitches, especially when used to connect a trailer to a motor vehicle, are typically detachable from the towing vehicle.

Hitches are made detachable from the towing vehicle to solve the following dilemma. It is useful for hitches to extend beyond the rear of the towing vehicle to facilitate attachment of the trailer to the hitch, and to allow the trailer to pivot freely relative to the towing vehicle. This extension, however, can be awkward and dangerous when the vehicle is used without the trailer attached.

A hitch is commonly attached to the towing vehicle by means of a rigid rectangular sleeve which is mounted at the rear of the vehicle. A rectangular shaft of the hitch that is slightly smaller than the sleeve is inserted into the sleeve. A pin or bolt is then inserted through matching holes in the side walls of the sleeve and shaft, and then fastened to prevent the pin or bolt from slipping out of the holes.

Some space is usually left between the walls of the sleeve and the walls of the shaft to allow easy attachment and detachment of the hitch. For the same reason, space is usually left between the pin or bolt and the holes in the walls of the shaft and sleeve. These spaces are large enough to allow for ease of coupling and decoupling of the hitch despite imperfections in the machining of the hitch and sleeve and despite rust and other surface accumulations.

The problem with these spaces is that they allow play in the connection between the hitch and the sleeve that can be noisy, bothersome and dangerous. The play between the walls of the hitch and sleeve can cause clanging noises and vibrations that can be felt within the towing vehicle. That play may also be magnified by the lever arm of the hitch so that it is felt more strongly by the trailer. The play between the pin or bolt and the holes in the walls of the shaft and sleeve can be felt mainly in the acceleration and deceleration of the trailer relative to the towing vehicle. Both types of play can cause loosening of the bolt or pin fastening the hitch, which can, on rare occasion, result in detachment of the hitch and trailer, possibly while traveling at high speed. Both types of play can also increase wear and stress on various parts of the mechanisms attaching the trailer to the towing vehicle, leading to the ultimate failure of those parts.

STATEMENT OF THE OBJECTS

Accordingly, it is an object of the present invention to provide a means for rigidly attaching a trailer hitch to a vehicle, while allowing attachment and detachment of that hitch to be easy and convenient.

Other objectives, advantages and novel features of the invention will become apparent to those skilled in the art upon examination of the invention and the accompanying drawings.

SUMMARY OF THE INVENTION

The present invention provides a means for making rigid the attachment of a hitch for a vehicular tow trailer to the towing vehicle, yet allows the hitch to be easily attached and detached. It accomplishes this by providing a controllable means for causing parts of the hitch to press upon the inside walls of the sleeve within which the hitch sits when attached.

In a preferred embodiment, the hitch comprises a shaft which slides into and a sleeve and is locked with a pin in a conventional manner, however, the shaft is divided into two parts along a plane inclined to the direction that the shaft slides within the sleeve. Those two parts are connected by a bolt which is operable from outside the shaft and sleeve, the bolt traveling through one of the parts and threading into the other part, the bolt as it is tightened pulling the two parts together and causing one part to slide to one side and the other part to slide to an opposite side due to the inclined plane between them. The parts continue to move sideways relative to each other until they press upon opposing inside walls of the sleeve, firmly wedging the shaft within the sleeve. The shaft can be detached from the sleeve by loosening the bolt, removing the pin and sliding the shaft out of the sleeve.

DESCRIPTION OF THE PREFERRED EMBODIMENTS

Figure 1:
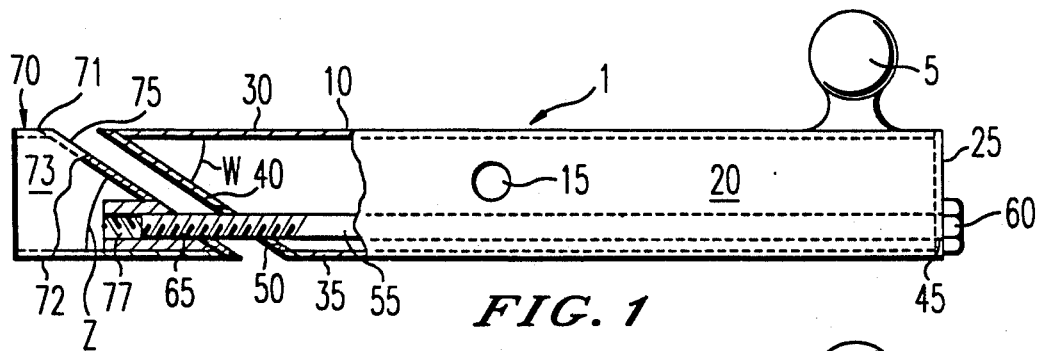
FIG. 1 is a side view of a first embodiment of this invention.

Referring to FIG. 1, a trailer hitch 1 is shown to have a ball 5 mounted on top of one end of a hollow, rigid, rectangular shaft 10. The shaft 10 has a circular aperture 15 in each side wall 20, the apertures 15 coaxial with each other on an axis perpendicular to planes defined by the side walls. The shaft 10 has an end wall 25 which is perpendicular to both the side walls and to a top wall 30 and a bottom wall 35, and which is located on the same end of the shaft as the ball 5.

The other end of the shaft 10 has a wall 40 which lies in a plane which is perpendicular to the side walls 20 but which is not perpendicular to the top 30 or bottom 35 walls of the shaft, instead forming a sharp angle W with the top wall 30. An aperture 45 is located in the bottom portion of the end wall 25, and another aperture 50 is located in the bottom portion of the end wall 40, so as to allow a cylindrical bolt 55 to pass through both end walls and travel the length of the shaft 10 without obstructing the passage between the circular apertures 15 in the side walls 20. The bolt 55 has a hexagonal head 60 at one end which is too large too fit through the aperture 45, while the other end of the bolt is threaded 65.

A matching wedge 70 is shown having top 71, bottom 72 and side walls 73 coplanar with the respective top 30, bottom 35 and side walls 20 of the shaft. The wedge 70 also has a wall 75 that lies in a plane parallel to the plane of the end wall 40 of the shaft, so that a sharp angle Z is made between that wall 75 and the bottom wall 72 of the wedge 70, the sharp angle Z being equal to the sharp angle W of the shaft. The wall 75 has a threaded socket 77 that the bolt 55 screws into.

Figure 2:
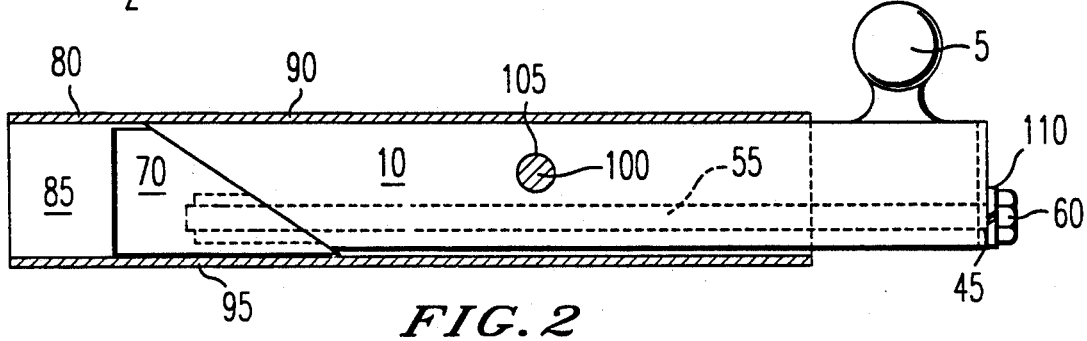
FIG. 2 is another side view of a first embodiment of this invention.

FIG. 2 shows the hitch shaft 10 with wedge 70 attached inserted into a hollow rectangular sleeve 80 which is mounted on a towing vehicle (towing vehicle and mounting method are not shown). The sleeve 80 has a pair of side walls 85, a top wall 90 and a bottom wall 95. After the hitch 1 has been inserted into the sleeve 80, a pin 100 is inserted through a pair of circular apertures 105 in the side walls 85 that are in line with the pair of circular apertures 15 in the side walls of the shaft 20. The pin 100, when inserted through the matching apertures 15 and 105, prevents the hitch 1 from sliding out of the sleeve. The pin 100 is then fastened to prevent it from sliding out of the apertures 15 and 105.

The bolt 55 is rotated so as to draw the wall 75 of the matching wedge 70 flush with the wall 40 of the hitch shaft 10. The bolt 55 is then tightened further, causing the wall 75 to slide downward relative to the wall 40 until the bottom wall 72 of the wedge 70 is pressed against the bottom wall 95 of the sleeve 80, and the top wall 30 of the shaft 10 is pressed against the top wall 90 of the sleeve 80. A lock washer 110 may be utilized between the head 60 and the aperture 45 to keep the bolt 55 from loosening unintentionally.

The hitch 1 is thereby affixed in the vertical direction relative to the sleeve 80, as the vertical play between the two has been removed. The hitch 1 is also affixed to the sleeve 80 in the horizontal direction due to the frictional force between the bottom wall 95 of the sleeve and the bottom wall 72 of the hitch wedge, and the top wall 90 of the sleeve and the top wall 30 of the hitch shaft.

Figure 3:
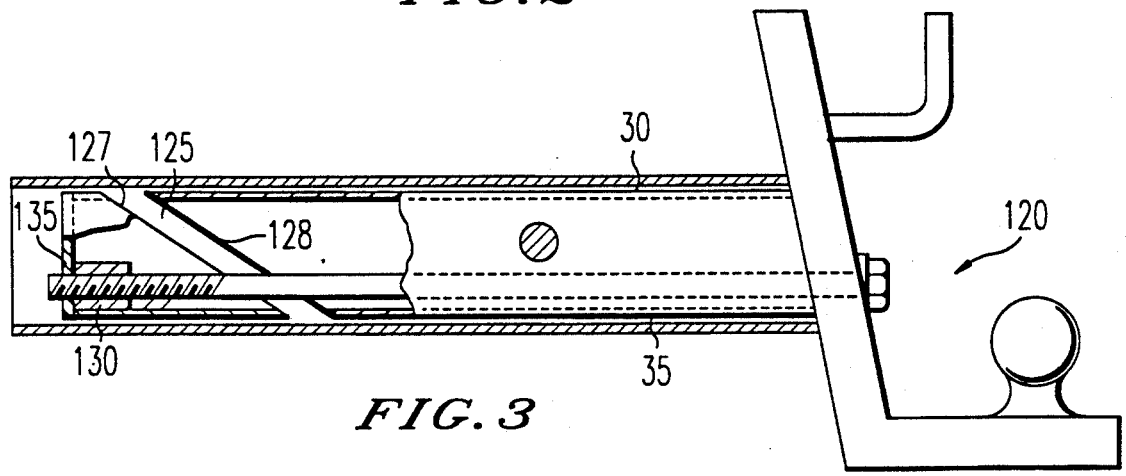
FIG. 3 is a side view of a second embodiment of this invention.

FIG. 3 shows another embodiment of the invention in which the ball end of the hitch is replaced with a modified mechanism 120 which can be used to either tow a trailer or hang a tow trailer vertically, as disclosed in co-pending application Ser. No. 07/855,572, which is hereby incorporated by reference. The present invention may be of particular use in this embodiment, as the vertically hanging tow trailer can become an unstable mass on a lever arm, a situation for which removal of the play in the hitch is important.

An independent difference between this embodiment and the previous one is shown at the end of the hitch opposite to the ball end. Instead of having the walls 40 and 73 of the previous embodiment, the shaft 10 has merely been cut in a plane 125 that is inclined relative to the top wall 30 and the bottom wall 35 of the shaft, resulting in matching rectangular, inclined edges 127 and 128 on both sides of the cut 125. The bolt 55 is threaded into a seat 130 attached to an end wall 135. As the bolt 55 is tightened the edges 127 and 128 slide past each other so as to wedge the shaft 10 in the sleeve 80, as in the previous embodiment. An advantage of this difference in this embodiment over the previous embodiment is in ease of manufacture or modification of an existing hitch. A disadvantage occurs when the shaft 10 is so loose in the sleeve 80 that the edges 127 and 128 may not be aligned to slide when the bolt 55 is tightened.

Figure 4:
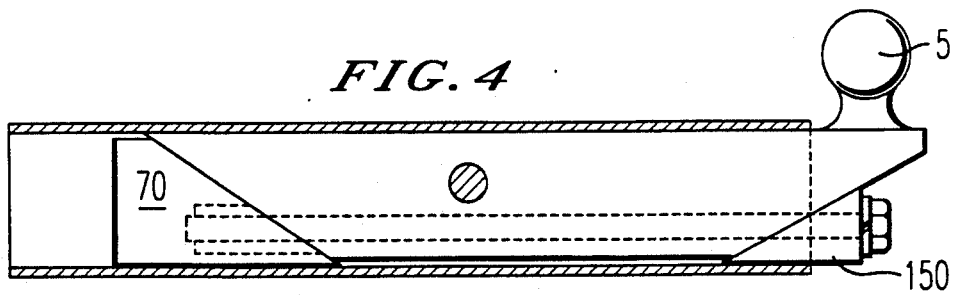
FIG. 4 is a side view of a third embodiment of this invention.

FIG. 4 demonstrates another embodiment of the invention, in which the matching wedge of the previous embodiments has been augmented with another matching wedge 150 at the other end of the shaft.

Figure 5:
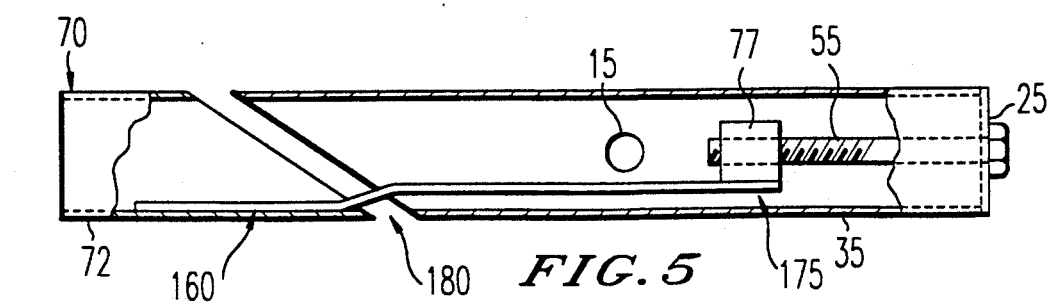
FIG. 5 is a side view of a fourth embodiment of this invention.

FIG. 5 shows another embodiment of this invention, which may be used for the situation where the bolt 55 is too thick to protrude past the aperture 15 without obstructing the aperture. The embodiment shown in FIG. 5 solves that problem by attaching a rigid strap 160 to bottom wall 72 of the wedge 70. The strap 160 is thin enough to pass between the bottom wall 35 of the shaft 10 without obstructing the aperture 15. The threaded socket 77 is attached to an end 175 of the strap 160 distal to the wedge 70, so that the bolt 55 can thread into the socket 77 while the socket is in a position between the aperture 15 and the end wall 25. The strap 160 has a bend 180 to allow the attached socket to be aligned with the bolt 55

Other embodiments of the present invention incorporating the features taught here will become obvious to those skilled in the art and are intended to fall within the scope of this invention. For example, the sharp angle W could be at the bottom of the shaft and the equivalent sharp angle Z at the top of the wedge. Or, the end walls of the shaft could be elongated and attached via hinges to other walls of the shaft, and could be pressed against the sleeve by a bolt drawing the end wall together. Another possibility is that the sleeve could be made to be pressed against the shaft, instead of the reverse. The foregoing description and drawings were given for illustrative purposes only, it being understood that the invention is not limited to the embodiments disclosed, but is intended to embrace any and all alternatives, equivalents, modifications or rearrangements of elements falling within the scope of the invention as defined by the following claims.

What is claimed is:

1. In a detachable hitch for a vehicular tow trailer, said hitch having a rigid shaft with an outside surface that slides into an inside surface of a rigid sleeve that is mounted on a towing vehicle, an aperture in the sleeve and an aperture in the shaft that are aligned when the shaft is inserted in the sleeve, and a pin that is inserted through the aperture in the sleeve and the aperture in the shaft to prevent the shaft from sliding out of the sleeve, the improvement comprising:
   (a) a means for transfiguring the shaft to cause a portion of the outside surface of the shaft to press upon a portion of the inside surface of the sleeve; and
   (b) a means for controlling the means for transfiguring the shaft to cause a portion of the outside surface of the shaft to press upon a portion of the inside surface of the sleeve.

2. An improvement to a detachable hitch as in claim 1 wherein the means for transfiguring the shaft to cause a portion of the outside surface of the shaft to press upon a portion of the inside surface of the sleeve comprises a division of the shaft into at least two parts.

3. An improvement to a detachable hitch as in claim 2, wherein the division of the shaft lies in a plane inclined to the direction that the shaft slides into and out of the sleeve.

4. An improvement to a detachable hitch as in claim 3, wherein the parts of the shaft can slide relative to each other along the division.

5. An improvement to a detachable hitch as in claim 4, wherein the means for controlling the means for transfiguring the shaft comprises a means for causing the parts of the shaft to slide relative to each other along the division.

6. An improvement to a detachable hitch as in claim 5, wherein the means for causing the parts of the shaft to slide relative to each other comprises a device that is attached to the parts and that can vary the combined length of the parts in the direction that the shaft slides into the sleeve.

7. In a detachable hitch for a vehicular tow trailer, said hitch having a rigid shaft with an outside surface that slides into an inside surface of a rigid sleeve that is mounted on a towing vehicle, an aperture in the sleeve and an aperture in the shaft that are aligned when the shaft is inserted in the sleeve, and a pin that is inserted through the aperture in the sleeve and the aperture in the shaft to prevent the shaft from sliding out of the sleeve, the improvement comprising:

(a) a means for transfiguring the shaft to cause a portion of the outside surface of the shaft to press upon a portion of the inside surface of the sleeve which means comprises a division of the shaft into at least two parts; such division lies in a plane inclined to the direction that the shaft slides into and out of the sleeve; and the parts of the shaft can slide relative to each other along the division; and (b) a means for controlling the means for transfiguring.

8. An improvement to a detachable hitch as in claim 7, wherein the means for controlling the means for transfiguring the shaft further comprises a bolt that is threaded on one end so as to thread into one of the parts and that has a head on its other end that protrudes from another of the parts so as to be controllable from outside the shaft and sleeve, the head being too large to pass through an aperture in the other part and the head also providing a means for rotation of the bolt, and a lock washer on the bolt between the head and the aperture that the head is too large to pass through, the lock washer also being too large to pass through the aperture.

* * * * *